(12) United States Patent
Biskeborn et al.

(10) Patent No.: US 8,611,044 B2
(45) Date of Patent: Dec. 17, 2013

(54) MAGNETIC HEAD HAVING SEPARATE PROTECTION FOR READ TRANSDUCERS AND WRITE TRANSDUCERS

(75) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/152,253

(22) Filed: Jun. 2, 2011

(65) Prior Publication Data

US 2012/0307397 A1    Dec. 6, 2012

(51) Int. Cl.
*G11B 5/127* (2006.01)

(52) U.S. Cl.
USPC .......................................................... 360/110

(58) Field of Classification Search
None
See application file for complete search history.

(56) References Cited

U.S. PATENT DOCUMENTS

| | | | |
|---|---|---|---|
| 4,659,606 A | 4/1987 | Wada et al. | |
| 4,797,767 A | 1/1989 | Baus, Jr. | |
| 5,034,838 A * | 7/1991 | Brock et al. | 360/122 |
| 5,062,021 A | 10/1991 | Ranjan et al. | |
| 5,074,971 A | 12/1991 | Tsuya et al. | |
| 5,165,981 A | 11/1992 | Yamakawa et al. | |
| 5,209,837 A | 5/1993 | Tsuya et al. | |
| 5,264,981 A | 11/1993 | Campbell et al. | |
| 5,323,282 A | 6/1994 | Kanai et al. | |
| 5,572,391 A | 11/1996 | Ishiwata | |
| 5,713,122 A | 2/1998 | Aboaf et al. | |
| 5,781,376 A | 7/1998 | Tsukamoto | |
| 5,822,153 A | 10/1998 | Lairson et al. | |
| 5,906,884 A | 5/1999 | Yahisa et al. | |
| 5,909,340 A | 6/1999 | Lairson et al. | |
| 6,172,858 B1 | 1/2001 | Yoda et al. | |
| 6,188,543 B1 | 2/2001 | Terunuma et al. | |
| 6,361,837 B2 | 3/2002 | Pangrle et al. | |
| 6,365,286 B1 | 4/2002 | Inomata et al. | |
| 6,416,839 B1 | 7/2002 | Xuan et al. | |
| 6,541,065 B1 | 4/2003 | Sasaki et al. | |
| 6,639,753 B1 | 10/2003 | Henze et al. | |
| 6,650,469 B2 | 11/2003 | Kim et al. | |
| 6,690,542 B1 * | 2/2004 | Wang | 360/129 |
| 6,757,143 B2 | 6/2004 | Tunayama et al. | |
| 6,759,081 B2 | 7/2004 | Huganen et al. | |
| 6,813,122 B1 | 11/2004 | Granstrom | |
| 6,822,831 B2 | 11/2004 | Ikeda et al. | |
| 6,846,434 B2 | 1/2005 | Akselrod | |
| 6,849,305 B2 | 2/2005 | Bravo-Vasquez et al. | |
| 6,937,435 B2 | 8/2005 | Saliba | |
| 7,055,010 B2 | 5/2006 | Lin et al. | |

(Continued)

OTHER PUBLICATIONS

U.S. Appl. No. 13/624,466, filed Sep. 21, 2012.

(Continued)

*Primary Examiner* — David D Davis
(74) *Attorney, Agent, or Firm* — Zilka-Kotab, PC

(57) ABSTRACT

A magnetic head according to one embodiment includes outer modules each having a media bearing surface and an array of transducers selected from a group consisting of data read transducers and write transducers; and at least one inner module positioned between the outer modules, the inner module having a media bearing surface and an array of transducers selected from a group consisting of data read transducers and write transducers, wherein a configuration of at least one protection feature for the transducers on the outer modules is different than a configuration of at least one protection feature for the transducers on the inner modules.

20 Claims, 9 Drawing Sheets

(56) References Cited

U.S. PATENT DOCUMENTS

| | | | |
|---|---|---|---|
| 7,072,916 B1 | 7/2006 | Lewis et al. | |
| 7,225,210 B2 | 5/2007 | Guthrie, II. | |
| 7,274,528 B2 | 9/2007 | Hamming et al. | |
| 7,281,317 B2 | 10/2007 | Ohno et al. | |
| 7,325,296 B2 | 2/2008 | Biskeborn | |
| 7,469,465 B2 | 12/2008 | Ding et al. | |
| 7,580,227 B2 | 8/2009 | Sato et al. | |
| 7,606,844 B2 | 10/2009 | Kottomtharayil | |
| 7,676,514 B2 | 3/2010 | Faibish et al. | |
| 7,676,904 B2 | 3/2010 | Chau et al. | |
| 7,760,465 B2 | 7/2010 | Koeppe | |
| 7,870,356 B1 | 1/2011 | Veeraswamy et al. | |
| 7,872,833 B2 | 1/2011 | Hu et al. | |
| 7,916,424 B2 | 3/2011 | Biskeborn | |
| 7,925,622 B2 | 4/2011 | Chapman | |
| 2001/0019464 A1 | 9/2001 | Poorman et al. | |
| 2002/0018920 A1 | 2/2002 | Yamamoto et al. | |
| 2002/0098381 A1 | 7/2002 | Coffey et al. | |
| 2002/0141112 A1 | 10/2002 | Saliba | |
| 2004/0032696 A1 | 2/2004 | Johnson et al. | |
| 2004/0084408 A1 | 5/2004 | Makarov et al. | |
| 2005/0110004 A1 | 5/2005 | Parkin et al. | |
| 2006/0078683 A1 | 4/2006 | Mukai | |
| 2007/0009717 A1 | 1/2007 | Wong | |
| 2007/0097560 A1 | 5/2007 | Karr et al. | |
| 2007/0109686 A1 | 5/2007 | Jose et al. | |
| 2008/0259494 A1 * | 10/2008 | Biskeborn | 360/122 |
| 2008/0259499 A1 | 10/2008 | Hu et al. | |
| 2008/0266711 A1 | 10/2008 | Nibarger et al. | |
| 2009/0052093 A1 | 2/2009 | Kawakita et al. | |
| 2009/0244772 A1 | 10/2009 | Sue et al. | |
| 2009/0268343 A1 * | 10/2009 | Biskeborn et al. | 360/110 |
| 2010/0007976 A1 | 1/2010 | Baumgart et al. | |
| 2010/0053817 A1 | 3/2010 | Biskeborn et al. | |
| 2011/0056825 A1 | 3/2011 | Baubet et al. | |
| 2011/0090589 A1 | 4/2011 | Biskeborn et al. | |
| 2011/0102947 A1 | 5/2011 | Ogawa et al. | |

OTHER PUBLICATIONS

U.S. Appl. No. 13/624,484, filed Sep. 21, 2012.
U.S. Appl. No. 13/601,068, filed Aug. 31, 2012.
Edwards et al., "FlexVol: Flexible, Efficient File Volume Virtualization in WAFL," USENIX Association, USENIX '08: 2008 USENIX Annual Technical Conference, pp. 129-142.
Meyer et al., "Parallax: Virtual Disks for Virtual Machines," 2008 ACM, EuroSys '08, Apr. 1-4, 2008, Glasgow, Scotland, UK, pp. 1-14.
Sapuntzakis et al., "Optimizing the Migration of Virtual Computers," Proceedings of the 5th Symposium on Operating Systems Design and Implementation, 2002, pp. 1-14.
U.S. Appl. No. 12/831,149, filed Jul. 6, 2010.
U.S. Appl. No. 13/457,916, filed Apr. 27, 2012.
Non-Final Office Action from U.S. Appl. No. 13/457,916 dated May 24, 2013.
Non-Final Office Action from U.S. Appl. No. 13/624,484 dated Oct. 15, 2013.

* cited by examiner

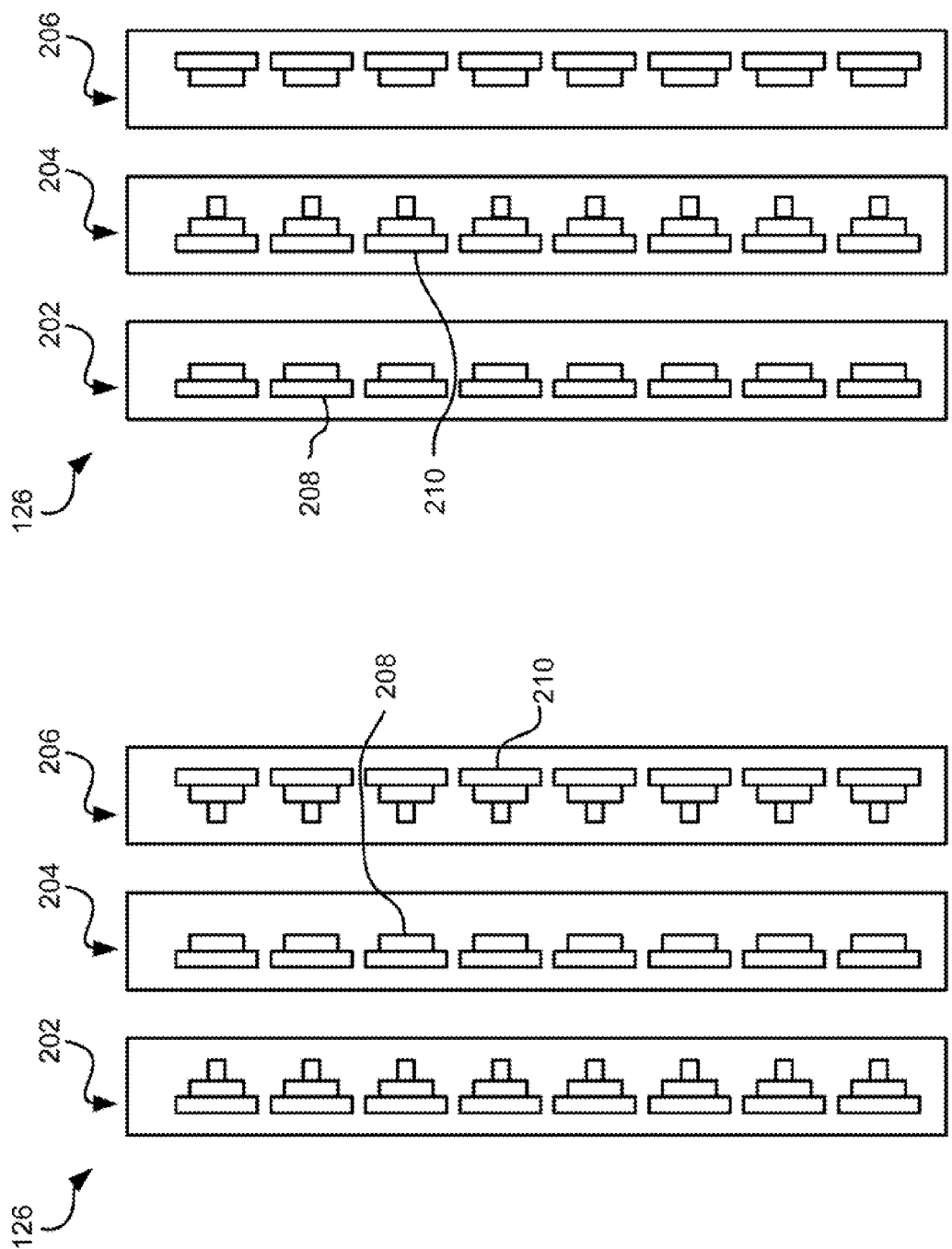

MAGNETIC HEAD HAVING SEPARATE PROTECTION FOR READ TRANSDUCERS AND WRITE TRANSDUCERS

BACKGROUND

The present invention relates to data storage systems, and more particularly, this invention relates to magnetic heads having separate protection for read transducers and write transducers.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A magnetic head according to one embodiment includes outer modules each having a media bearing surface and an array of transducers selected from a group consisting of data read transducers and write transducers; and at least one inner module positioned between the outer modules, the inner module having a media bearing surface and an array of transducers selected from a group consisting of data read transducers and write transducers, wherein a configuration of at least one protection feature for the transducers on the outer modules is different than a configuration of at least one protection feature for the transducers on the inner modules.

A magnetic head according to another embodiment includes outer modules each having a media bearing surface and an array of write transducers; and at least one inner module positioned between the outer modules, the inner module having a media bearing surface and an array of data read transducers, wherein a configuration of at least one protection feature for the write transducers on the outer modules is different than a configuration of at least one protection feature for the data read transducers on the inner modules.

A magnetic head according to yet another embodiment includes a first module having a media-facing surface and a write transducer; and a second module having a media-facing surface and a data read transducer, wherein a configuration of at least one protection feature for the write transducer on the first modules is different than a configuration of at least one protection feature for the data read transducer on the second module.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems of any type, as well as operation and/or component parts thereof.

In one general embodiment, a magnetic head includes outer modules each having a media bearing surface and an array of transducers selected from a group consisting of data read transducers and write transducers; and at least one inner module positioned between the outer modules, the inner module having a media bearing surface and an array of transducers selected from a group consisting of data read transducers and write transducers, wherein a configuration of at least one protection feature for the transducers on the outer modules is different than a configuration of at least one protection feature for the transducers on the inner modules.

In another general embodiment, a magnetic head includes outer modules each having a media bearing surface and an array of write transducers; and at least one inner module positioned between the outer modules, the inner module having a media bearing surface and an array of data read transducers, wherein a configuration of at least one protection feature for the write transducers on the outer modules is different than a configuration of at least one protection feature for the data read transducers on the inner modules.

In yet another general embodiment, a magnetic head includes a first module having a media-facing surface and a write transducer; and a second module having a media-facing surface and a data read transducer, wherein a configuration of at least one protection feature for the write transducer on the first modules is different than a configuration of at least one protection feature for the data read transducer on the second module.

Figure 1:
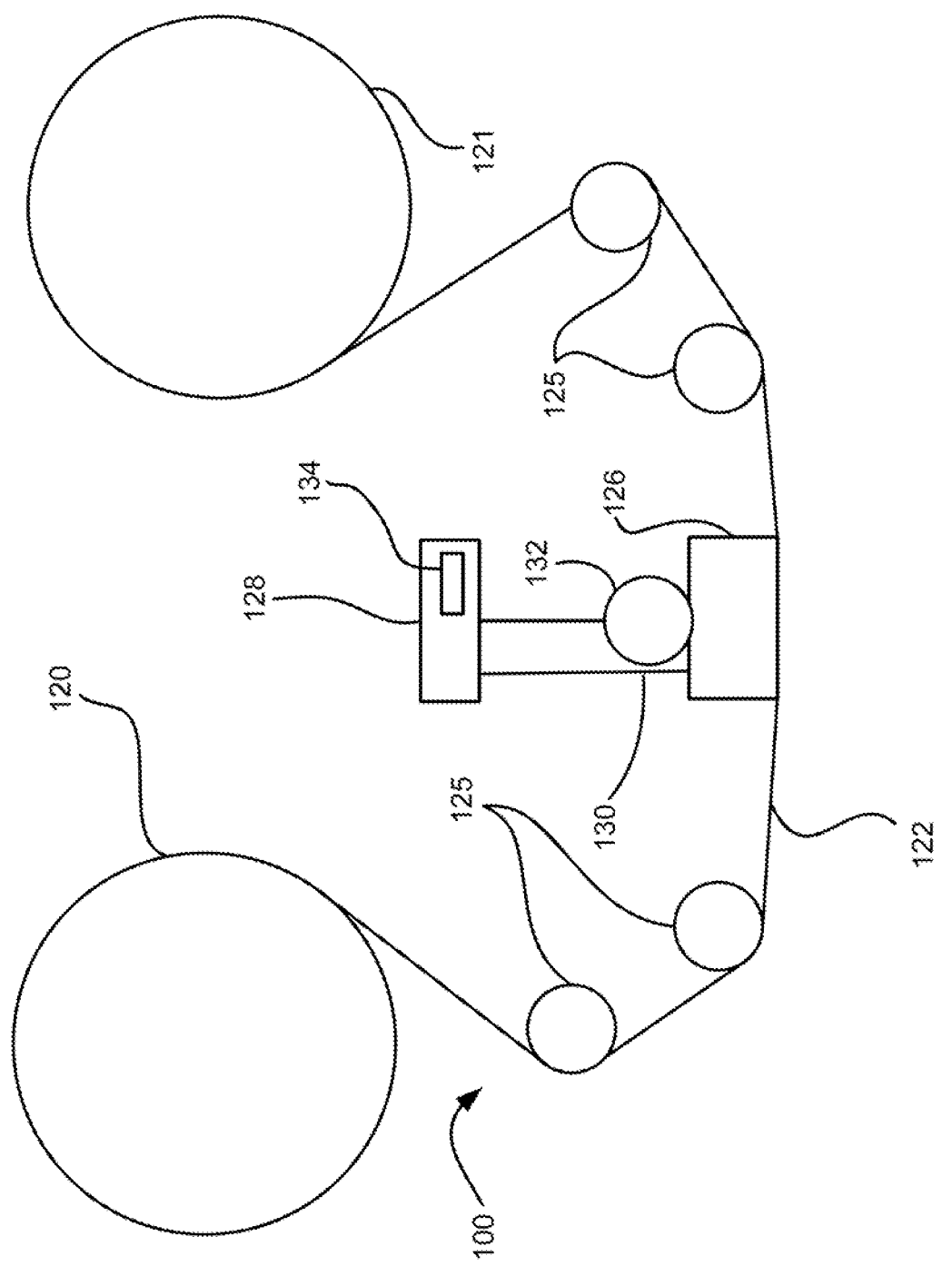
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of read transducers, write transducers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
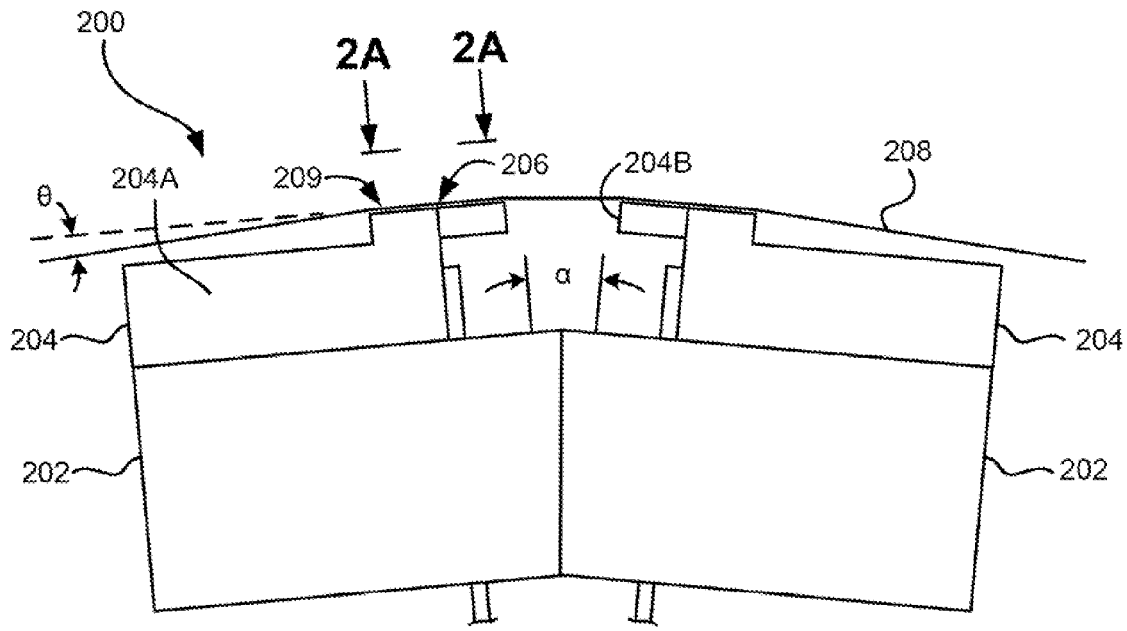
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The read transducers and write transducers may be arranged in a piggyback configuration. The read transducers and write transducers may also be arranged in an interleaved configuration. Alternatively, each array of channels may be read transducers or write transducers only. Any of these arrays may contain one or more servo track readers for reading servo data on the medium.

Figure 2A:
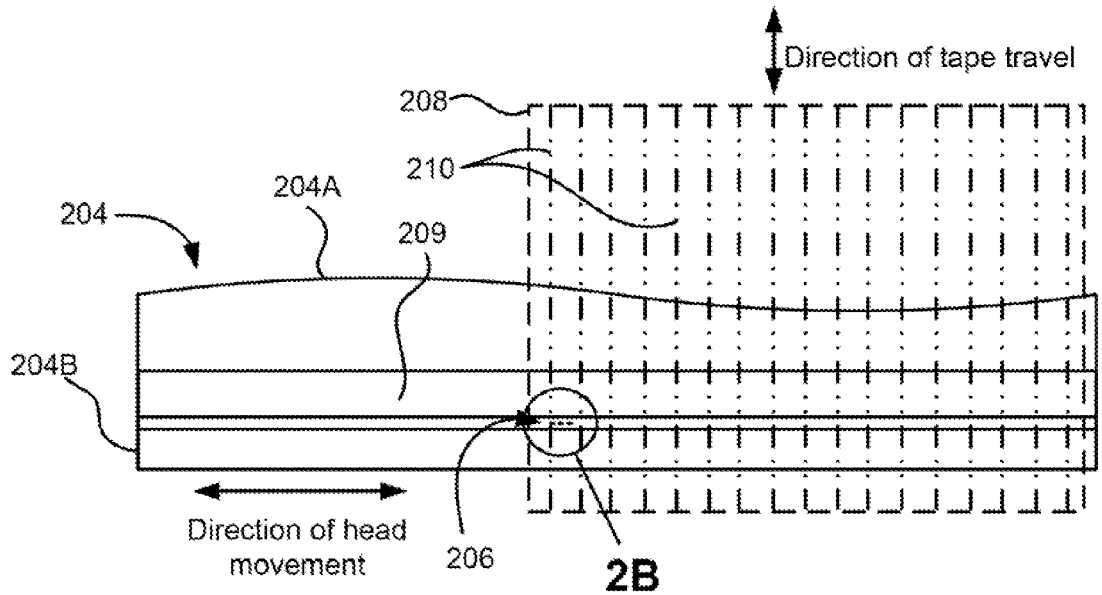
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the read transducers and/or write transducers 206 are positioned to specific track positions within one of the data bands. Outer readers, sometimes called servo readers, read the servo tracks 210. The servo signals are in turn used to keep the read transducers and/or write transducers 206 aligned with a particular set of tracks during the read/write operations.

Figure 2B:
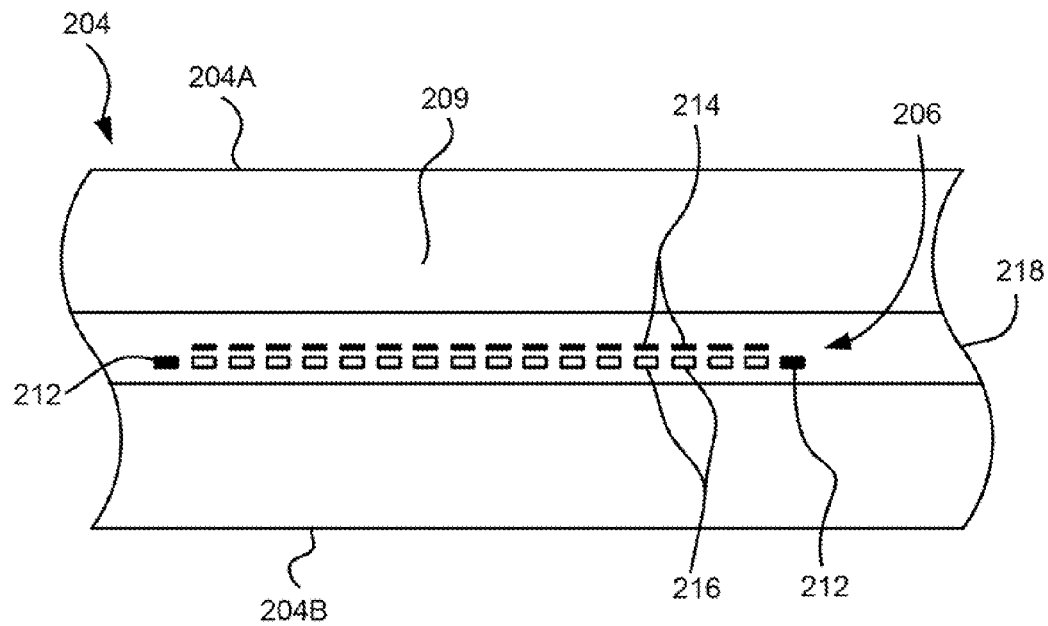
FIG. 2B is a detailed view taken from Circle 2B of FIG. 2A.

FIG. 2B depicts a plurality of read transducers and/or write transducers 206 formed in a gap 218 on the module 204 in Circle 2B of FIG. 2A. As shown, the array of read transducers and write transducers 206 includes, for example, 16 write transducers 214, 16 read transducers 216 and two servo readers 212, though the number of elements may vary. Illustrative embodiments include 8, 16, 32, 40, and 64 read transducers and/or write transducers 206 per array. A preferred embodiment includes 32 read transducers per array and/or 32 write transducers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the read transducers and write transducers may be arranged in a piggyback configuration as shown in FIG. 2B, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2 and 2A-B together, each module 204 may include a complementary set of read transducers and/or write transducers 206 for such things as bi-directional reading and writing, read-while-write capability, backward compatibility, etc.

Figure 2C:
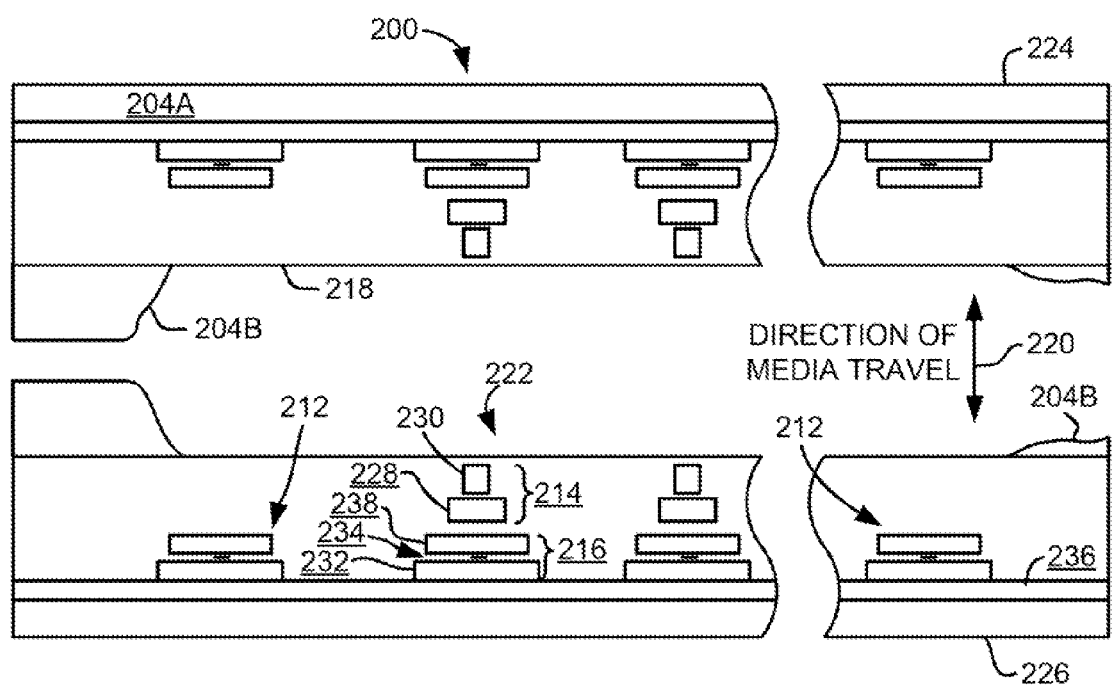
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The write transducers, exemplified by the write head 214 and the read transducers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second write transducer pole tips 228, 230, and a coil (not shown).

The first and second write transducer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 202, 206 each include one or more arrays of write transducers 210. The inner module 204 of FIG. 3 includes one or more arrays of read transducers 208 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
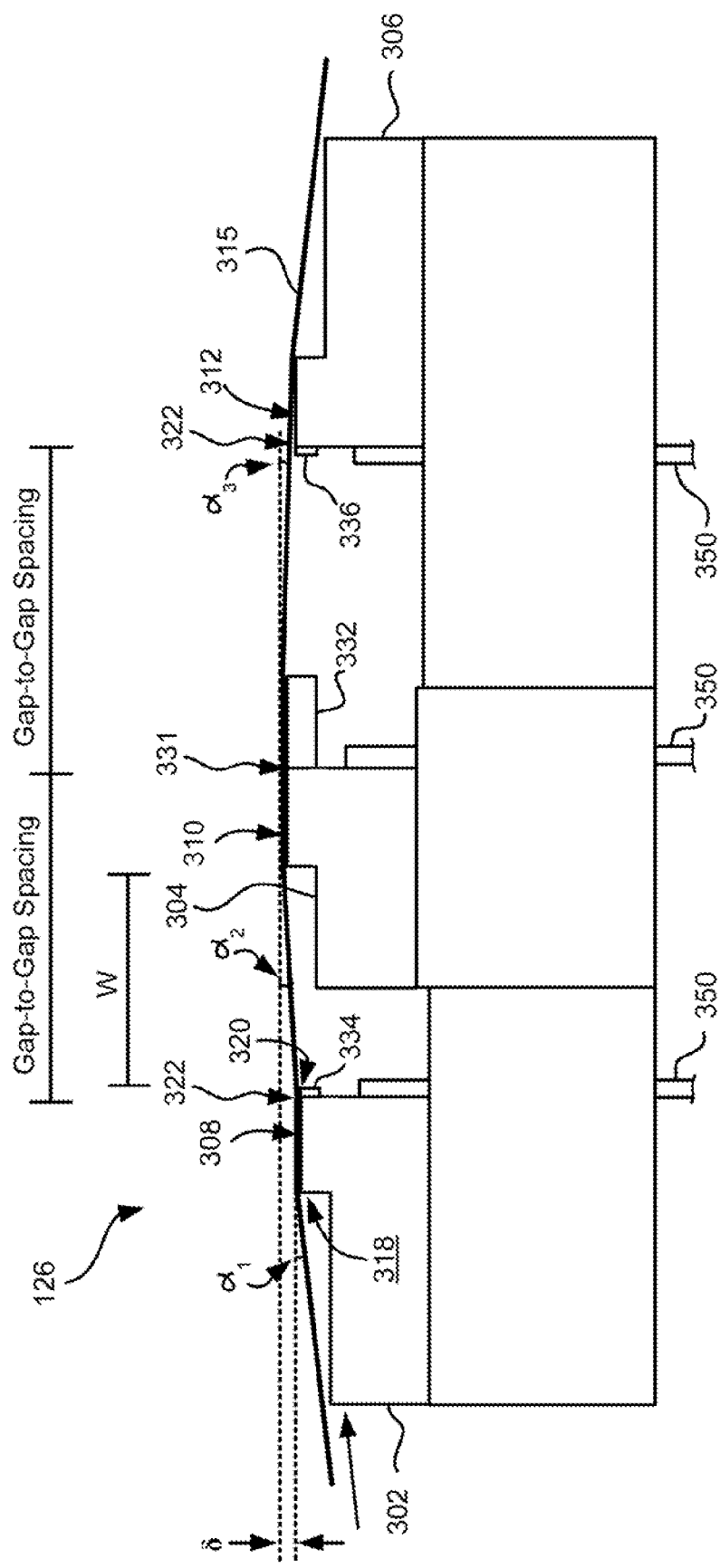
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
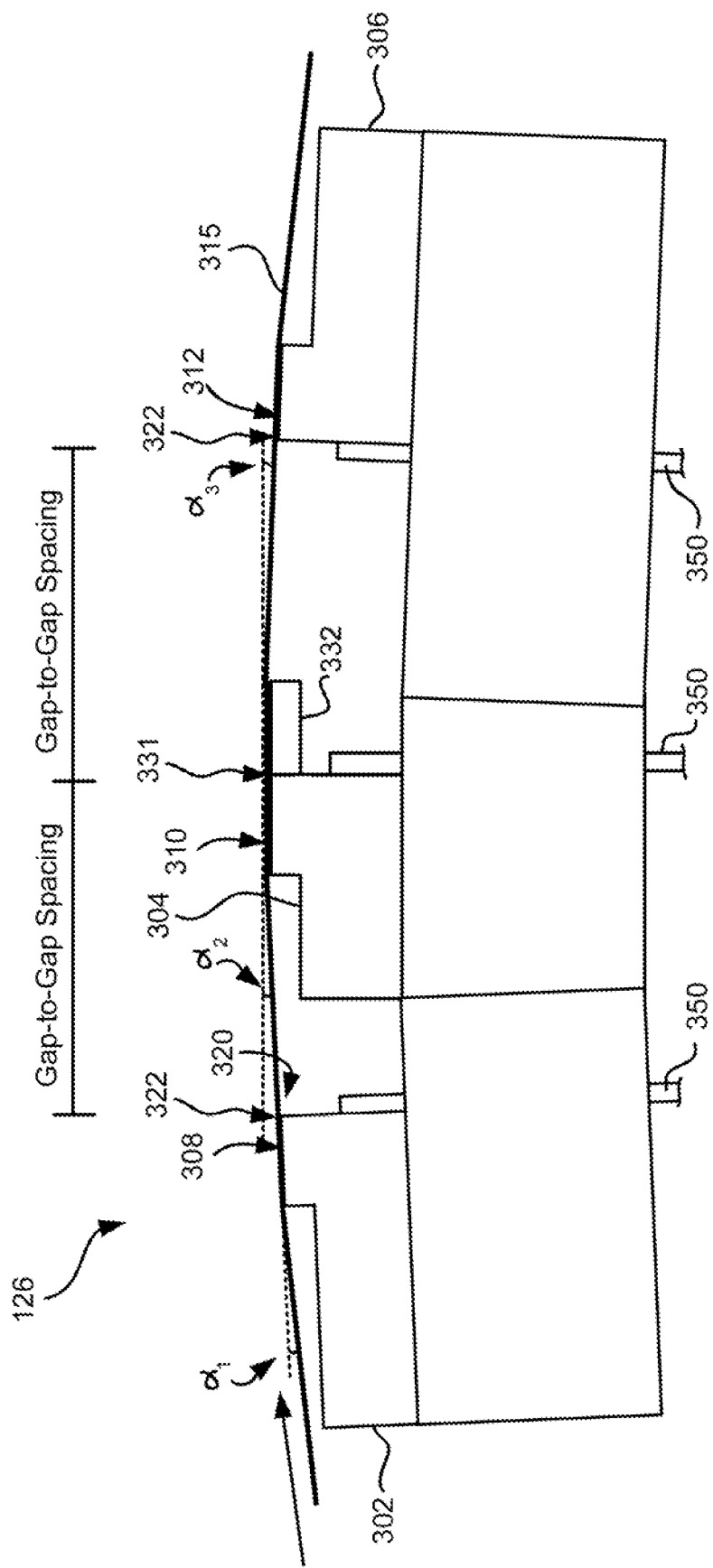
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle is achieved at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
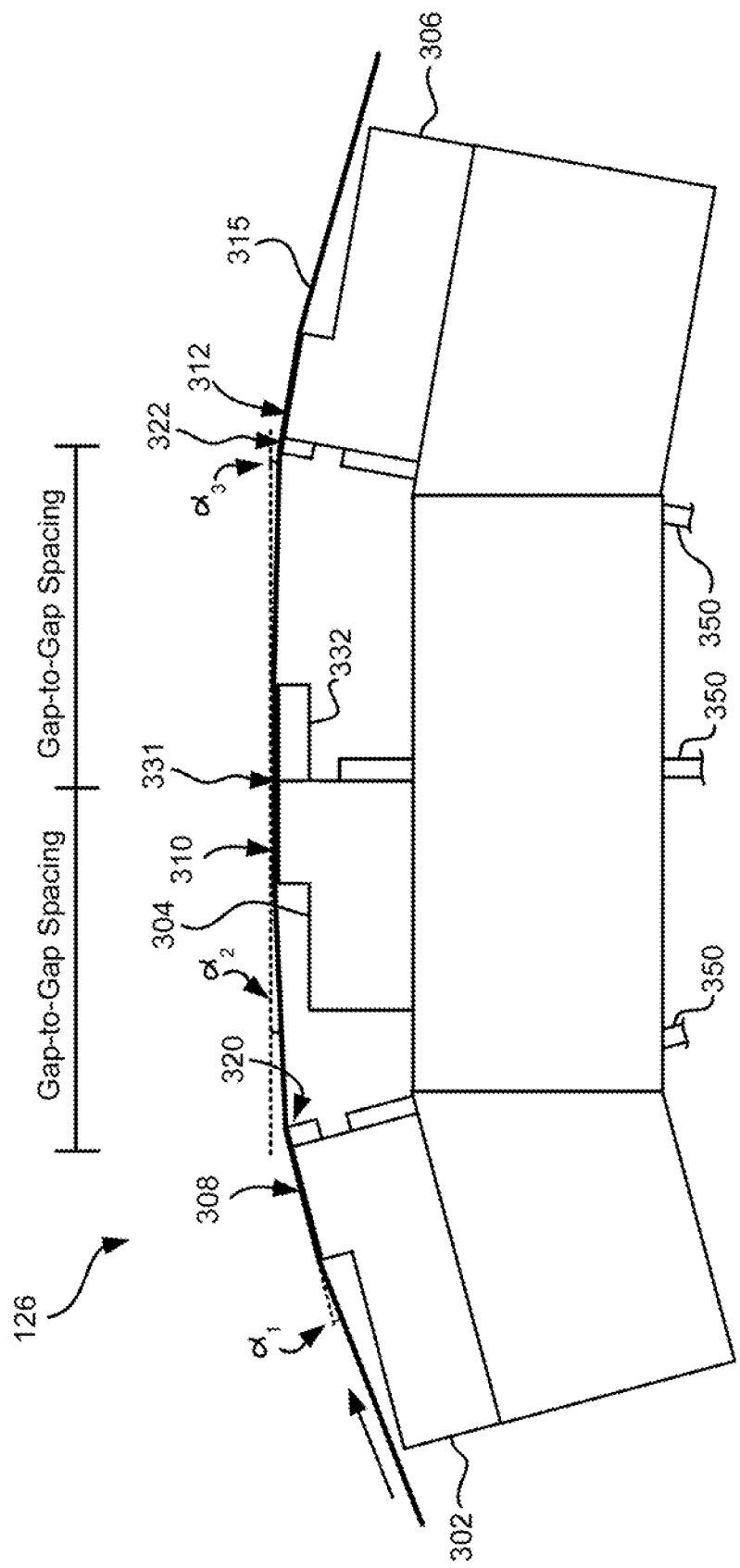
FIG. 7 is a side view of a magnetic tape head with three modules in an overwrap configuration.

FIG. 7 illustrates an embodiment where the modules 302, 304, 306 are in an ovenvrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the write transducers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

In a tape based storage system, physical contact occurs between the head and the medium. One problem that the contact creates is acceleration of wear and other degradation processes such as corrosion, shorting, overheating due to thermal asperities, deposit formations etc. Accordingly, various embodiments of the present invention provide solutions to the foregoing problems.

A magnetic head according to one embodiment includes outer modules each having a tape bearing surface and an array of transducers selected from a group consisting of read transducers and write transducers; and at least one inner module positioned between the outer modules, the inner module having a tape bearing surface and an array of transducers selected from a group consisting of data read transducers and write transducers. As used herein, the terms "reader," "read transducer," "sensor," etc. generally refer to a read transducer, while "servo" used in conjunction with any of these terms generally refers to a servo reader. The configurations of the modules may be as set forth above, or in any configuration.

A configuration of one or more protection features for the transducers on the outer modules is different than a configuration of one or more protection features for the transducers on the inner modules. Such different configurations of protection features may be as simple as one module having protection features and the other module not having any protection features, or different types and/or combinations of protection features on the respective modules. For example, in one approach, the at least one inner module has the protection features, while the outer modules do not have protection features. This type of configuration may be particularly useful for a W-R-W head, though it may be used in other configurations.

In another approach, the at least one inner module does not have protection features, while the outer modules have the protection features. This type of configuration may be particularly useful for a R-W-R head, though it may be used in other configurations.

In one embodiment, the protection features of the module or modules having the data read transducers includes recessed data read transducers, i.e., the thin films that constitute the data read transducers are recessed from the plane of the tape bearing surface of the substrate and/or closure (if present). An extent of the recession may be selected based on any suitable criterion.

Figure 8:
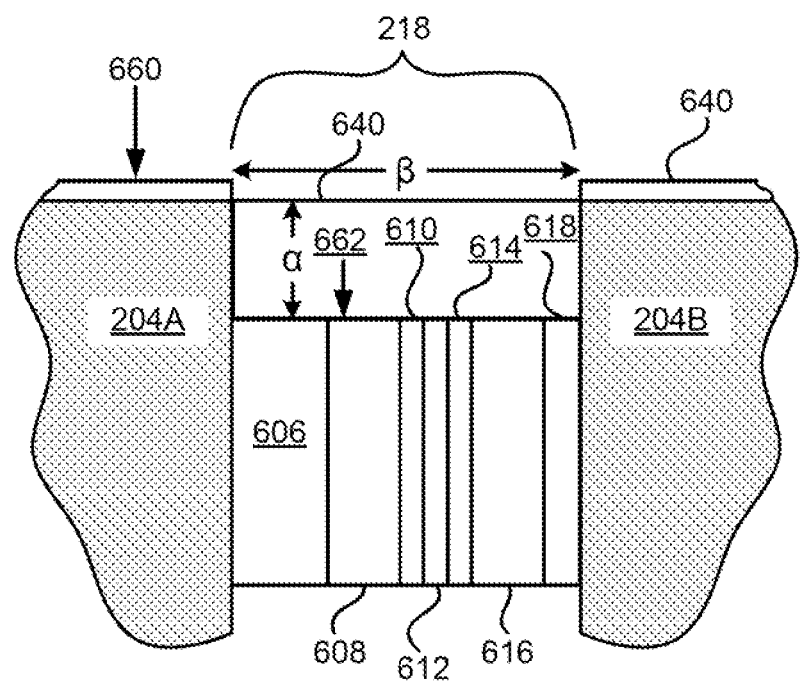
FIG. 8 is a schematic view of a portion of a magnetic head according to one embodiment.

For exemplary purposes, thin films associated with a data read transducer are identified in FIG. 8, such as: undercoat insulation 606, optional first shield 608 which may be insulated from MR sensors 612 by one or more thin films 610, and an optional second shield 616 which may be insulated from the data read transducer 612 by one or more thin films 614, including at least one insulator layer. In other approaches, the shields 608, 616 serve as the leads for the sensors 612. An overcoat layer 618 may separate a second shield 616 from the closure 204B. There may also be other thin films and the overall design and ordering of these thin films is for illustrative purposes only, and in no way should limit the invention, nor should the inclusion of the substrate 204A and closure 204B in this description. The gap 218 may be comprised of more or less layers than is described in this example, and additional layers not mentioned here may be included to expand, adjust, or limit the functionality of the sensor array 612. Also, additional sensor arrays 612 may be included in the gap 218.

The distance that the gap 218 is recessed may be selected based on factors such as the subsequent coating wear resistance and gap width β. In one approach, the gap 218 may be recessed by a distance α of between about 2 nm and about 50 nm, more preferably between about 5 nm and about 20 nm. However, more or less recession may be used depending on the individual characteristics of the gap 218, coating, and magnetic head. Moreover, though all layers in the gap are shown as having the same amount of recession, those skilled in the art will recognize that the amount of recession of a particular layer will depend on a variety of factors such as milling angle, relative milling rates of the materials, etc. Accordingly, the extent α of gap recession may be an average of the distances of the layers to the plane 660 of the tape bearing surface of the head.

In one approach, the extent α of the recession of the data read transducers corresponds to a distance from a plane 660 of the tape bearing surface of the module sufficient to reduce a signal of a legacy tape compatible with the head to a level that substantially eliminates distortion of readback signals from the data read transducers when reading the legacy tape. An example of a legacy tape may be a tape designed for LTO 3, where the head is designed for LTO 5. Newer generation tapes almost always have less output than older generation tapes. The reason is that in order to get magnetic spacing down and other improvements, the magnetic coatings are fabricated thinner and each generation. The higher field of the older tapes can be strong enough to cause sensor distortion. By increasing the read transducer-tape spacing, the field is reduced. A magnetic transducer should be designed to accommodate the highest-output tape that the head will see. Conventionally, this is done on the assumption of zero recession of the sensor. Thus, a more optimal design is achieved, in some embodiments, when a head is designed to accommodate the lower maximum field that is seen by the sensor as a consequence of recession of the sensor. Thus, a more sensitive sensor may be used. Accordingly, this embodiment goes against conventional wisdom, which would dictate that one would design a new head to accommodate the legacy tape assuming zero recession. The inventors have proceeded contrary to conventional wisdom by selecting a spacing that provides improved reading with the legacy tapes, thereby improving reading newer tapes.

The recession may be effected by etching, as by ion-milling at a predetermined milling angle. The milling can be tailored to recess the gap films relative to the tape support portions (substrate 204A or closure 204B) of the head.

In some embodiments, the gap 218 may be recessed using mechanical or chemical-mechanical processing, milling, etching, and other techniques which are used in the art of thin film processing, as will be understood by those having ordinary skill in the art.

In one particularly preferred embodiment, the gap 218 is recessed using ion-milling, a technique used in the art of thin film processing, as would be understood by those having ordinary skill in the art. An illustrative ion milling step may include milling with an argon plasma or directional ion beam.

In a similar manner, the protection features of the module or modules having write transducers may include recessed write transducers. The extent of recession of the write transducers from the plane 660 of the tape bearing surface of the head may be the same as, more, or less than an extent of recession of the read transducers. Preferably, the extent of recession of the write transducers is less than that of the read transducers.

While in general, read channels are able to equalize the readback signal to recover the information written to the tape in spite of a larger tape to transducer spacing, the same is not generally true for writing. Particularly, signals that get imprinted on the tape are best if the tape is in intimate contact with the write transducer. The quality of the written data declines as the tape gets further from the write transducer, and declines in such a way that there is generally no way to re-equalize the signal. Accordingly, to maintain sharp magnetic transitions on the medium, a smaller write transducer-tape spacing is desirable.

Figure 10:
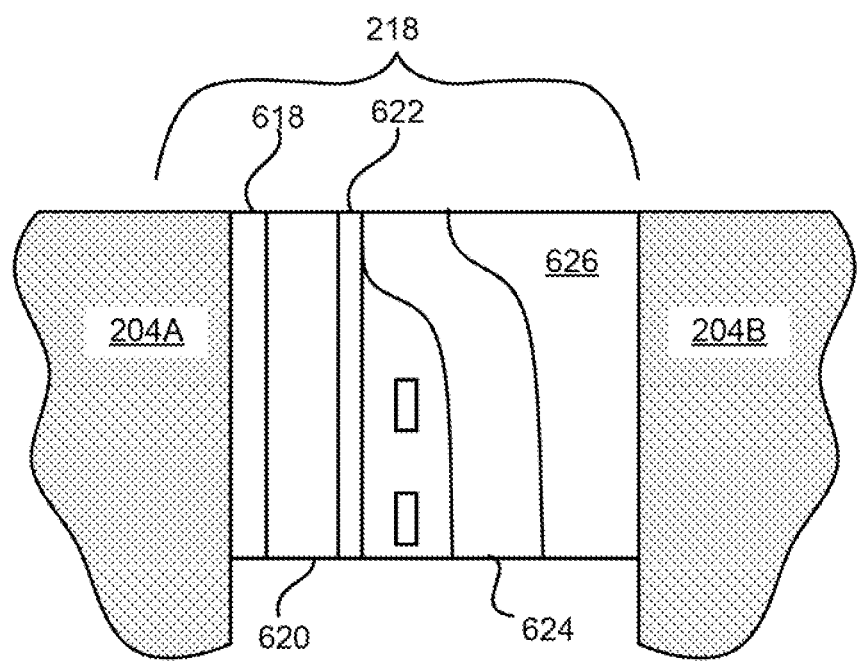
FIG. 10 is a schematic view of a portion of a magnetic head according to one embodiment.

In one approach, the write transducers are not recessed. See, e.g., FIG. 10, showing for exemplary purposes, several thin films associated with a module having a write transducer, such as: a non-insulating (or insulating) layer 618 separating the substrate 204A from a first pole 620. Another layer 622, often forming the write transducer gap, may separate the first pole 620 from a second pole 624 in the gap region. An overcoat insulator layer 626 may be followed by a bondline (not shown) near the closure 204B. There may also be other thin films and the overall design and ordering of these thin films is for illustrative purposes only, and in no way should limit the invention, nor should the inclusion of the substrate 204A and closure 204B in this description. The gap 218 may be comprised of more or less layers than is described in this example, and additional layers not mentioned here may be included to expand, adjust, or limit the functionality of the write transducer array.

Figure 9:
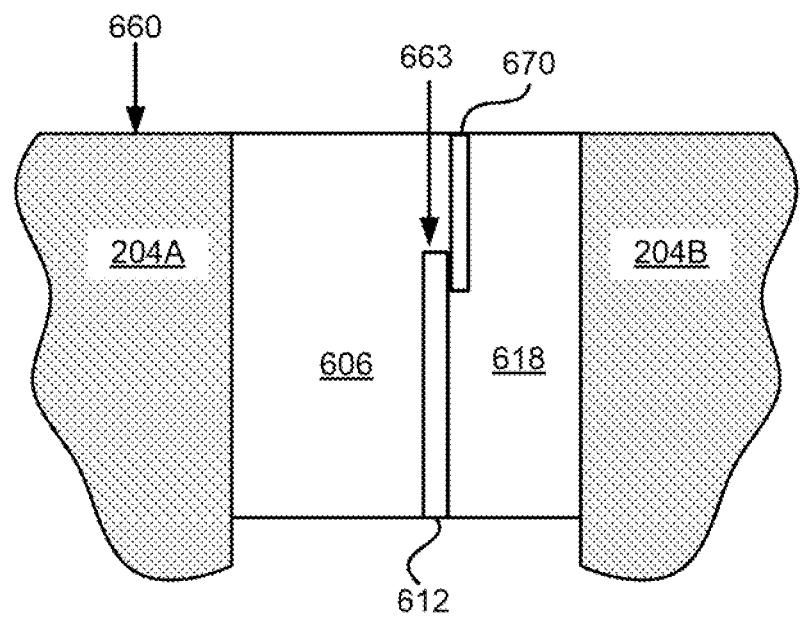
FIG. 9 is a schematic view of a portion of a magnetic head according to one embodiment.

In one embodiment, as exemplified in the simplified view of FIG. 9, the module having recessed data read transducers includes flux guides 670 of a magnetically permeable material extending above ends 663 of the data read transducers. Any known flux guide configuration may be used. Illustrative flux guide materials include permalloy, CZT, etc. Note that other layers such as shields may also be present.

In another embodiment, a protection feature or one or more of the modules may be a protective coating 640, e.g., of a type known in the art, overlying at least a tape-facing surface of the transducers. See FIG. 8. Illustrative coating materials include metal oxides such as aluminum oxide and chrome oxide; diamond like carbon (DLC), etc. Additional suitable coating methods and materials are found in U.S. patent application Ser. No. 13/152,247, entitled "Magnetic Head Having Polycrystalline Coating" to Biskeborn et al., filed concurrently herewith, and which is herein incorporated by reference.

The coating may be used with or without recession of the transducers, the former being preferred to extend the life of the coating. Accordingly, in one approach, the protection features of the module modules having the data read transducers includes a coating 640 in the recess defined by the tape-facing surface of the data read transducers. The coating may or may not overlie the adjacent substrate and/or closure. To remove the coating from above the substrate and/or closure, the coating may be removed by any suitable process, such as kiss lapping.

Figure 11:
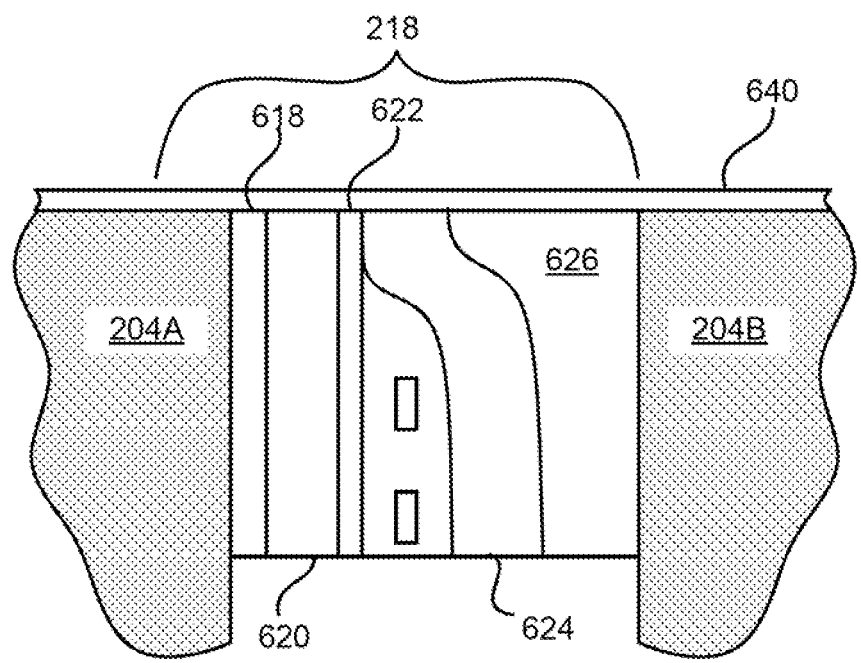
FIG. 11 is a schematic view of a portion of a magnetic head according to one embodiment.

In one approach, a module having write transducers does not include a coating over the tape-facing surface of the write transducers thereof. See, e.g., FIG. 10. In another approach, a coating 640 overlies a tape-facing surface of the write transducers, as shown in FIG. 11. Preferably, the coating overlying the write transducers is thinner than the coating overlying the data read transducers. In yet another approach, the coating overlying the write transducers may be in a recess defined by the write transducers, and may or may not be as thick as the coating overlying the read transducers.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
outer modules each having a media bearing surface and an array of transducers selected from a group consisting of data read transducers and write transducers; and
at least one inner module positioned between the outer modules, the inner module having a media bearing surface and an array of transducers selected from a group consisting of data read transducers and write transducers,
wherein a configuration of at least one protection feature for the transducers on the outer modules is different than a configuration of at least one protection feature for the transducers on the at least one inner module,
wherein the at least one protection feature of at least one of the modules having the data read transducers includes recessed data read transducers.

2. A head as recited in claim 1, wherein the at least one inner module has the at least one protection feature, wherein the outer modules do not have the at least one protection feature.

3. A head as recited in claim 1, wherein the at least one inner module does not have the at least one protection features, wherein the outer modules have the at least one protection feature.

4. A head as recited in claim 1, wherein the at least one protection feature of the at least one of the modules having the data read transducers includes a coating in a recess defined by the media-facing surface of the data read transducers.

5. A head as recited in claim 1, wherein the at least one protection feature of at least one of the modules having write transducers includes recessed write transducers, wherein an extent of recession of the write transducers is less than an extent of recession of the read transducers.

6. A head as recited in claim 1, wherein write transducers of at least one of the modules having the write transducers are not recessed.

7. A head as recited in claim 1, wherein an extent of the recession of the data read transducers corresponds to a distance from a plane of a media bearing surface of at least one of the modules sufficient to reduce a signal of a legacy tape compatible with the head to a level that substantially eliminates distortion of readback signals from the data read transducers when reading the legacy tape.

8. A head as recited in claim 1, wherein the at least one of the modules having the recessed data read transducers includes flux guides extending above media-facing ends of the data read transducers.

9. A head as recited in claim 1, wherein the at least one protection feature of at least one of the modules having the data read transducers includes a coating overlying a media-facing surface of the data read transducers.

10. A head as recited in claim 9, wherein at least one of the modules having write transducers does not include a coating over the media-facing surface of the write transducers thereof.

11. A head as recited in claim 9, wherein the at least one protection feature of at least one of the modules having the write transducers includes a coating overlying a media-facing surface of the write transducers, wherein the coating overlying the write transducers is thinner than the coating overlying the data read transducers.

12. A data storage system, comprising:
a magnetic head as recited in claim 1;
a drive mechanism for passing a magnetic medium over the magnetic head; and
a controller electrically coupled to the magnetic head.

13. A magnetic head, comprising:
outer modules each having a media bearing surface and an array of transducers selected from a group consisting of data read transducers and write transducers; and
at least one inner module positioned between the outer modules, the inner module having a media bearing surface and an array of transducers selected from a group consisting of data read transducers and write transducers,
wherein a configuration of at least one protection feature for the transducers on the outer modules is different than a configuration of at least one protection feature for the transducers on the at least one inner module, wherein the at least one protection feature of at least one of the modules having the data read transducers includes a coating overlying a media-facing surface of the data read transducers, wherein the at least one protection feature of at least one of the modules having the write transducers includes a coating overlying a media-facing surface of the write transducers, wherein the coating overlying the write transducers is thinner than the coating overlying the data read transducers.

14. A head as recited in claim 13, wherein the at least one protection feature of at least one of the modules having the data read transducers includes recessed data read transducers.

15. A magnetic head, comprising:
   outer modules each having a media bearing surface and an array of write transducers; and
   at least one inner module positioned between the outer modules, the inner module having a media bearing surface and an array of data read transducers,
   wherein a configuration of at least one protection feature for the write transducers on the outer modules is different than a configuration of at least one protection feature for the data read transducers on the inner modules,
   wherein the at least one protection feature of the at least one inner module is selected from a group consisting of:
   recessed data read transducers; and
   a coating overlying a media-facing surface of the data read transducers, wherein any coating overlying the write transducers is thinner than the coating overlying the data read transducers.

16. A head as recited in claim 15, wherein the at least one inner module has the at least one protection feature, wherein the outer modules do not have the at least one protection feature.

17. A head as recited in claim 15, wherein the at least one protection feature of the at least one inner module includes the recessed data read transducers.

18. A head as recited in claim 17, wherein the write transducers of the outer modules are not recessed.

19. A head as recited in claim 15, wherein the at least one protection feature of the at least one inner module includes a coating overlying a media-facing surface of the data read transducers, wherein the outer modules either do not have a coating over the media-facing surface of the write transducers or have a coating that is thinner than the coating overlying the data read transducers.

20. A data storage system, comprising:
   a magnetic head as recited in claim 15;
   a drive mechanism for passing a magnetic medium over the magnetic head; and
   a controller electrically coupled to the magnetic head.

* * * * *